Feb. 14, 1933.    R. F. MACFARLANE    1,897,207
WAFER ICING MACHINE
Filed May 28, 1930    2 Sheets-Sheet 2
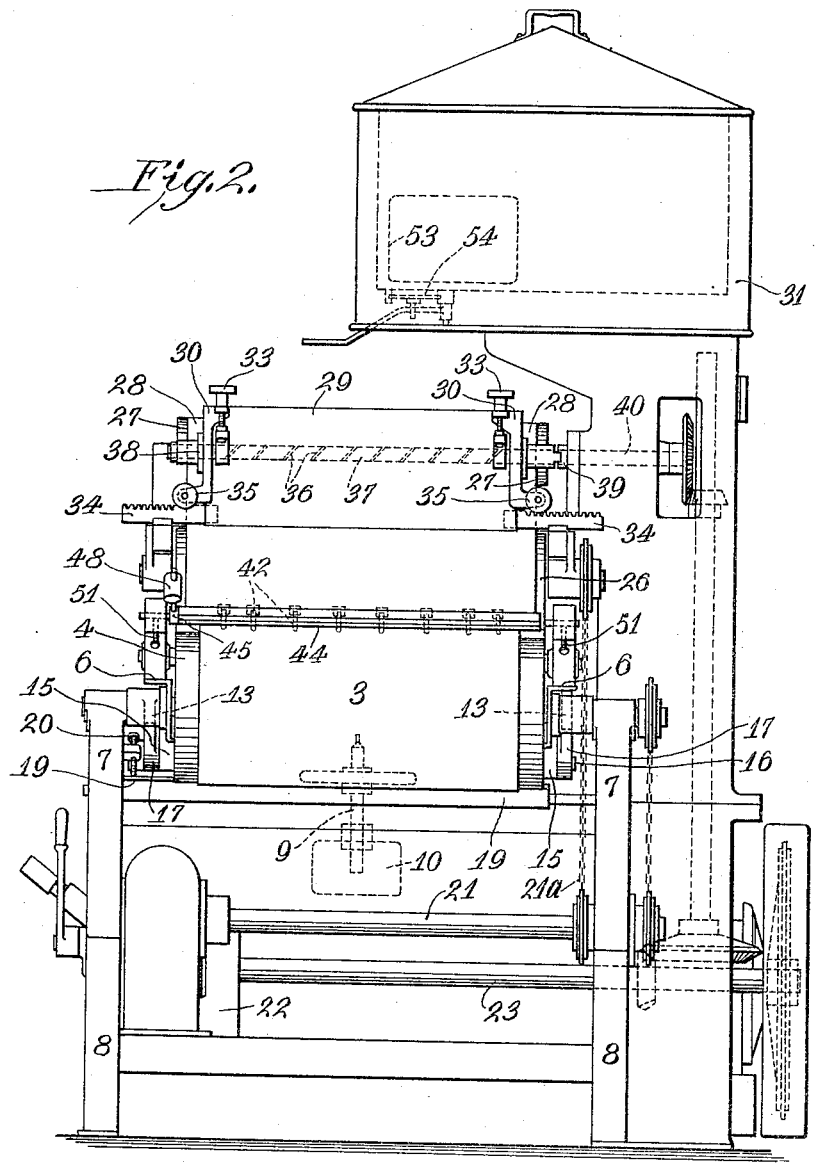
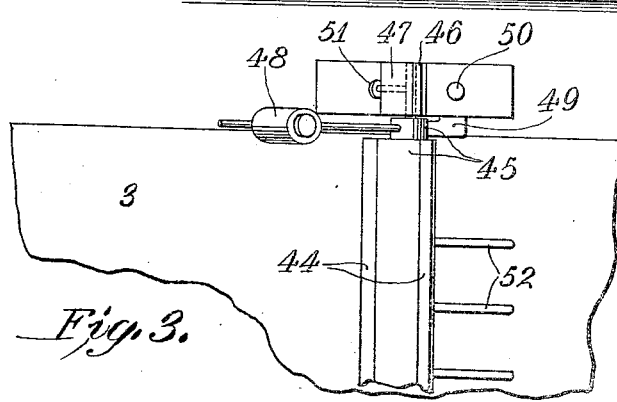
INVENTOR
ROBERT FRENCH MACFARLANE
BY
George B. Willcox
ATTORNEY Patented Feb. 14, 1933

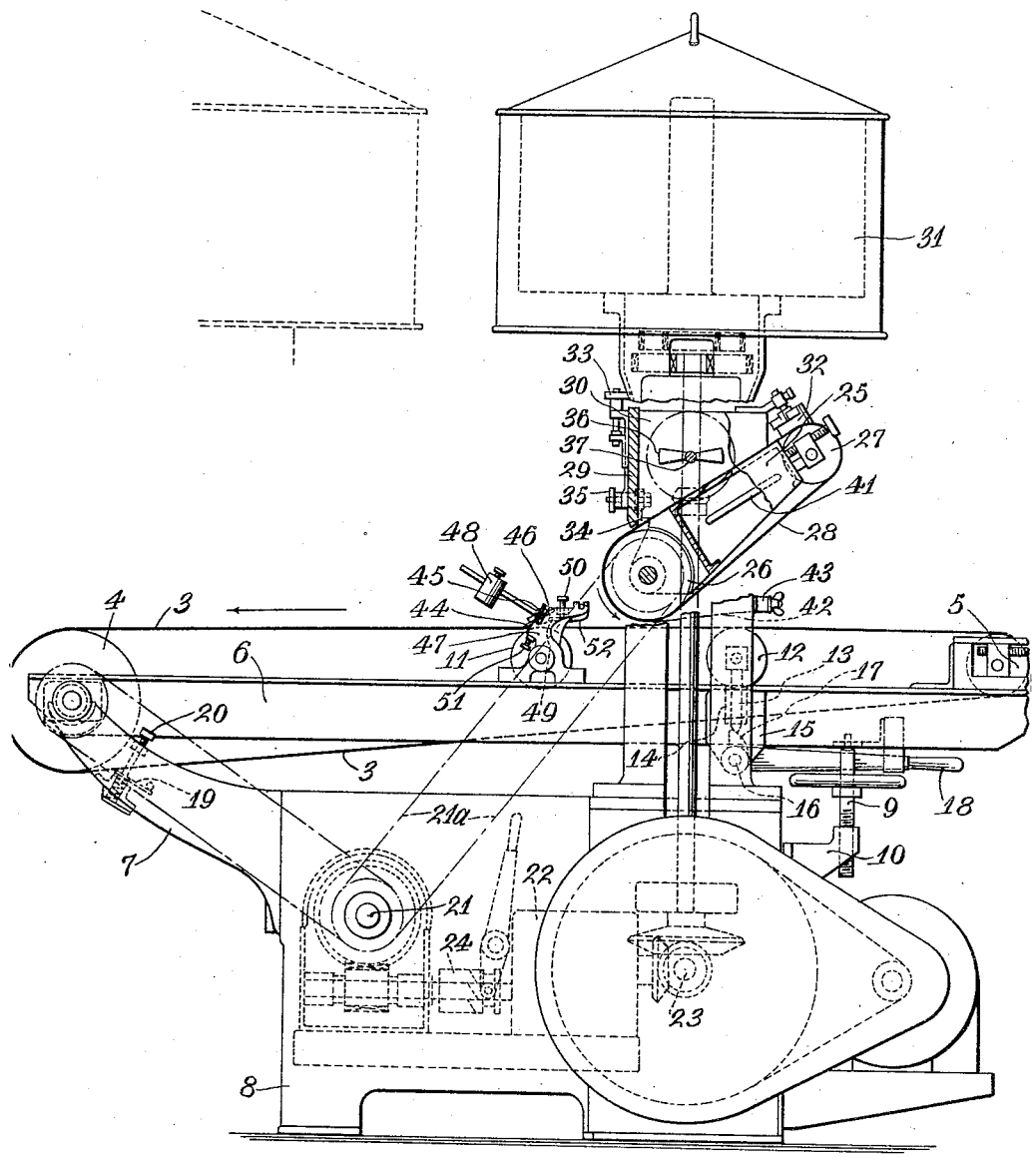

1,897,207

UNITED STATES PATENT OFFICE

ROBERT FRENCH MACFARLANE, OF FULHAM, LONDON, ENGLAND, ASSIGNOR TO BAKER PERKINS COMPANY, INC., OF SAGINAW, MICHIGAN, A CORPORATION OF NEW YORK

WAFER ICING MACHINE

Application filed May 28, 1930, Serial No. 456,728, and in Great Britain June 4, 1929.

This invention relates to machines for depositing or laying coatings upon surfaces, the invention being particularly applicable for laying and spreading cream, icing and the like upon wafers, cakes or such like edible goods.

The object of the present invention is to provide a machine of the above character affording simple control means for regulating the depositing, spreading and smoothing devices, said means operating without damage to the wafers.

The principle according to which the invention operates is, transporting the wafers in succession in a horizontal path beneath a main depositing device and thence onward through a cream spreading and smoothing device to the point of discharge from the transporting conveyor.
The cream depositing device causes the cream to approach the advancing rows of wafers in the form of a wide flat layer of gauged thickness and width. The layer of cream, at the moment of its deposition on the wafer, is found to be traveling on the under side of a conveyor belt that has brought the cream constantly closer to the wafer, the direction of travel of the inverted cream layer, at the moment when the cream touches the wafers, being opposite the direction of movement of the advancing row of wafers. The cream is thus laid gently down upon the moving wafers, and there is no chance for the cream to roll up, or become squeezed against the wafers and break them. Each wafer draws, by contact with the bottom face of the inverted layer of cream, a proper quantity of the material to form the desired thickness of cream coating. The wafers, at the point of application of the cream, are held down upon their transporting conveyor so as to be compelled to travel with it without slipping, by means of a spring hold-down device which is a part of my claimed invention, serving to maintain a steady feed of the wafers throughout the cream depositing period.

Coincidently the wafers are held against the cream-applying means by a yielding or resilient pressure device that constitutes a part of my invention.

Another claimed feature is found in the means for adjusting the height of the transporting conveyor to vary the thickness of the cream layer deposited on the wafers.

A further claimed feature of the invention is an improved means for spreading and later smoothing the cream layer after it has been deposited on the biscuit.

Further advantages achieved by the invention will hereinafter appear.

The preferred embodiment of the invention comprises an endless belt or apron upon or to which the cream is fed or supplied and a conveyor adapted to support and feed wafers in relation to the cream applying apron, the belt or apron being arranged to travel, during the laying of the cream, in a direction opposite to that of the wafer feed.

In the accompanying drawings, which illustrate a machine for applying cream coatings to wafer biscuits, Fig. 1 is a side elevation of the machine.

Fig. 2 is an end elevation corresponding thereto.

Fig. 3 is a fragmentary top view of the smothing device.

In carrying the invention into effect according to one convenient mode, by way of example, the machine comprises a conveyor 3 for feeding the wafers to and through the cream depositing position, and one or more cream applying and associated devices. The conveyor 3 comprises an endless band, preferably of canvas, supported at either end on suitable rollers 4 and 5. The rollers 4 and 5 are carried upon a frame 6 which is pivotally mounted about the axis of the roller 4 upon a bracket 7 attached to the bed 8 of the machine. The free end of the frame is supported by an adjusting screw 9 carried in a bracket 10 whereby the conveyor band 3 may be adjusted vertically for different thicknesses of wafers.

The conveyor 3 is adapted to be driven by the roller 4, and the tension thereof may be adjusted by adjusting the roller 5.

The upper lap of conveyor 3 is provided with suitable intermediate rollers for guiding the travel of the lap and according to the preferred arrangement one roller 11 is mounted on the delivery side (to the left in Fig. 1) of the cream depositing position and a second roller 12 is provided on the feed side of the cream depositing position. One of the rollers, preferably 12, is displaceable in a vertical plane for the purpose of displacing or deflecting the upper lap of the traveling band in relationship to the cream depositing means. The rollers 11 and 12 are carried in bearings supported by the vertically adjustable frame 6.

Preferably, as shown in the drawings, the bearings of the roller 12 are formed with pins 13 working in guides 14 carried by the brackets 15 attached to the vertically adjustable frame 6. The brackets 15 also carry a rock shaft 16 having cams 17 engaging the lower ends of the guide pins 13. By rotating the rock shaft 16 by means of the lever 18, the roller 12 may be adjusted vertically relatively to the table 6 and thus adjust the upper lap of the conveyor 3.

Associated with the return lap of the conveyor 3 a scraper or knife 19 is arranged to remove any cream which may have been deposited on the conveyor and deflect it into a collecting chute or box. The scraper is pivotally mounted in the brackets 7 and is spring pressed into contact with the conveyor, a screw stop 20 being provided.

The driving roller 4 is driven from the shaft 21 which in turn is driven through a variable speed gear 22 from the main drive shaft 23, a suitable clutch 24 being interposed.

As above indicated, and as shown diagrammatically by dotted lines in Fig. 1, the machine may comprise a plurality of cream applying devices for manufacturing, for example, a product consisting of a plurality of superimposed wafers with intervening layers of cream. In such case the number of cream applying devices will correspond with the number of cream layers which the product is to contain. The cream applying means are positioned longitudinally of the conveyor band 3, and a space is left between each cream applying means sufficient to enable an attendant to place the superposed wafer in position. Alternatively, the superposed wafers may be added from a hopper automatically, in known manner.

The several cream applying means will correspond in construction with one another and for present purposes it will be sufficient to describe a single instance.

The cream applying means is supported by a framework or arm 25 mounted over the conveyor band 3 and adapted to support a pair of spaced rollers 26, 27 around which an endless canvas or other apron 28 is adapted to travel. One roller 26 is arranged so that its periphery lies adjacent but spaced from the normal path of the conveyor band 3 while the other roller 27 is positioned above and in a vertical plane to the rear of that in which the roller 26 is situated, with a view to arranging the forwarding or upper lap of the apron 28 on an incline suitable for the reception of a supply or feed of cream. The upper roller 27 is mounted in adjustable bearings so that the tension of the band 28 may be varied.

Over the forwarding lap of the apron a cream feeding or supply box is mounted. This box preferably comprises a front and two side walls 29, 30 respectively, the bottom, and/or upper sides being open. The rear of the box is left conveniently open for the return of any cream which may not have been deposited on a wafer and also to facilitate the feeding of a supply of cream to the box from a hopper 31 positioned above the same. At the sides of the rear of the box, adjustably supported plates or pads 32 may be provided for directing outlying cream on the apron 28, into the supply box.

The front wall 29 of the cream box is provided with a shutter or vertically sliding door which is adapted variably to control the egress slot for the cream as it is drawn from the box by the apron.

The front wall 29 is adjustable vertically by screws 33 carried by the side walls 30.

The width of the layer of cream on the apron is adjusted by side boards 34, Fig. 2, formed as racks and adjustable laterally by pinions operated by the milled heads 35 carried by the side walls 30.

Paddles 36 on a shaft 37 located in bearings 38 on the side walls 30 are provided for spreading the cream uniformly over the apron. The walls of the box are mounted so that they may be readily removed for cleaning purposes, hence a clutch 39 is provided between the paddle shaft 37 and its driving shaft 40.

On the under-side of the forward lap of the apron 28 an electrical or other heating unit 41 is provided and this unit may lie partially or wholly beneath the box so that the cream residing therein may be kept at the desired temperature. If desired, the heating means may be combined with a water circulating device for cooling during hot weather.

Suitable drive means, including a variable speed gear, are provided for causing the travel of the endless apron 28 around the rollers in a direction opposite to that in which the wafers are caused to be fed by the conveyor band 3 at the time cream is being applied, that is to say, looking at the machine in side elevation, Fig. 1, if the conveyor lap is running from right to left the roller 26 of the apron 28 is driven anti-clockwise.

Consequently the roller 26 may be driven as shown from the shaft 21 by chain 21a.

On the wafer feed side of the apron a plurality of resilient finger devices 42 are mounted upon a bar 43 positioned over and transversely of the conveyor band 3. This bar may be vertically adjustable and/or may be angularly adjustable to vary the angular position or tension of the fingers. Each finger preferably comprises a resilient blade terminating in a thinner resilient strip which extends to or preferably slightly beyond the vertical plane passing through the axis of the lower roller 26 to the apron 28.

The function of the fingers 42 is to create a suitable and even pressure upon the wafers as they are fed to the cream supplying position in order to increase the frictional contact between their inner surface and the conveyor band 3. This increased frictional contact ensures that the wafers are steadily fed forward irrespective of any tendency the counter-clockwise travel of the cream on apron 28 may have to retard their progress or cause a reverse movement.

In action, the apron 28 draws out or carries away with it a layer of cream from the supply box which is applied to the wafers by the apron as they are advanced under the lower roller 26 of the apron by the conveyor band 3. The thickness of the layer of cream supplied depends upon the rate at which the apron travels in relation to the rate of forward feed of the wafer and the layer of cream may be varied by altering the relative rate of travel as desired. Further, the thickness of the cream may be also altered or varied by adjustment of the shutter 29 on the forward side of the supply box so that a thicker or thinner layer of cream is drawn out or carried down by the apron.

During the applying of the cream layer and in order to assure the correct relative positions and frictional contact of the wafer with the band, the vertically displaceable roller 12 referred to hereinbefore is raised in order to deflect the course or path of the upper lap of the conveyor band 3 so that it no longer occupies the normal spaced relationship to the cream apron but supports the wafer (while it traverses the zone under the apron roller 26) with a resilient pressure due to the flexibility and tension of the band from roller 12 to roller 11. The displaceable roller 12 is maintained in its elevated position during the period of the cream application, after which it can be lowered to allow the conveyor band to return to its normal position.

After the cream has been applied to a wafer, the latter passes under a smoothing device preferably in the form of a blade or inclined knife edge 44 which is pivotally supported upon a transverse bar 45 secured in slots 46 in the bearings 47 for the roller 11 so that vertical and/or angular adjustment of knife edge 44 may be effected. The bar 45 is provided with a weighted lever 48 for giving the desired resilient pressure of the knife 44 on the creamed wafer. Stop means to limit the downward movement of knife 44 may be provided such as, for example, short levers or lugs 49 upon the bar 45 adapted to co-operate with set screws 50, the adjustment of which causes the angular position or height of the knife to be varied to suit the thickness of the cream layer on the wafer passing under it. Adjustment of the bar 45 in the slots 46 is provided by the set screws 51. The object of the knife or blade 44 is to contact lightly with the cream layer and to smooth or polish the surface of the cream and eliminate any irregularities or vague impressions which may have been left by the resilient fingers 42. Means may be employed, in known manner, to warm the knife so that its action upon the cream layer is of the right kind for the purpose in question.

To provide the necessary friction between the wafers and the conveyor 3 while passing beneath the smoothing knife 44, spring fingers 52, similar to the fingers 42 are mounted adjacent the knife 44.

The supply of cream may be fed to the cream box either continuously or intermittently from the hopper 31 which has suitable stirring means 53 therein and a discharge outlet controlled by a sliding door 54. Hopper 31 is preferably jacketed and provided with electrical heating units or a circulating means to maintain the desired temperature for the cream, in the usual way.

When a wafer has received its cream layer and has passed under the smoothing blade, an attendant may place a second wafer upon the cream layer.

Where a series of cream-applying devices are employed, as indicated by dotted lines in Fig. 1, the sandwich may be passed by the conveyor to the second cream depositing device and its associated appliances and there receive another layer of cream upon the superposed wafer, and so on, until the desired number of wafers with the intervening layers of cream have been built up.

The cream in the various cream-applying devices may be of different colors and if it is desired to vary the color of the cream transversely of the wafer the supply box may be divided by a vertical partition or partitions to form compartments containing cream of the various colors, the arrangement being such that the apron 28 draws layers of cream from the compartments in bands whose edges lie adjacent or contiguous, so that they merge into one another as they lie upon the band or when deposited upon a wafer.

Having thus described my invention, what I claim and desire to secure by Letters Patent is:

1. In combination, a wafer forwarding conveyor and means for actuating the same, a movable frame upon which said conveyor is mounted, adjusting means for raising and lowering an end of said frame, a roller mounted on said frame and independently adjustable toward and from the wafer-carrying run of the conveyor, a cream supply hopper above said run, an endless traveling band beneath said hopper, cream feeding devices and thickness-gauging devices operatively associated with the hopper and the traveling band, means for appropriately directing the portion of said band carrying a layer of cream, toward said wafer forwarding conveyor so as to bring the outer or exposed face of said layer of cream into contact with the faces of wafers on the conveyor, the direction of travel of said cream-carrying band, at such point of cream application, being opposite to the direction of travel of the wafer conveyor, spring hold-down means arranged to yieldingly press wafers against the conveyor while they are passing said point of cream application, and cream-spreading, cream-smoothing and thickness-gauging devices operatively associated with said conveyor beyond said point, for the purposes set forth.

2. In combination, a wafer-forwarding conveyor and means for actuating the same, a cream supply hopper above the working run of said conveyor and having a cream-feeding outlet at the lower edge of a wall thereof, a downwardly inclined band traveling beneath said hopper and arranged to receive a layer of cream from said outlet, a portion of said surface directed so as to bring the exposed face of said layer of cream into contact with the faces of wafers on said conveyor while traveling oppositely to said band at the point of cream application, spring hold-down means arranged to yieldingly press the wafers against the conveyor while they are passing said point of cream application, a cream-smoothing and thickness-gauging blade operatively arranged above the conveyor beyond said point of cream application, and spring hold-down means adjacent said blades adapted to engage the wafers and press them against the conveyor during the operation of the blades upon the coated wafers.

3. In combination, a wafer-forwarding conveyor, a cream-carrying traveling surface adapted to spread cream on the upper faces of wafers on said conveyor, said surface traveling oppositely to said conveyor at the point of application of the cream to the wafers, means for supplying a layer of cream to said endless surface, and spring hold-down elements arranged to yieldingly apply pressure continuously upon the wafers to keep them in frictional engagement with the conveyor while they are being spread with the oppositely traveling layer of cream.

4. In a biscuit icing machine including a wafer-forwarding conveyor, an endless traveling surface for spreading cream on the upper faces of wafers on said conveyor and traveling oppositely to said conveyor at the point of application of the cream to the wafers, and having means for supplying a layer of cream to said endless surface, a plurality of fingers mounted upon a bar positioned over and transversely of said conveyor, said bar being adjustably mounted to vary the pressure exerted by the fingers, said fingers comprising resilient blades extending substantially to the point of cream application and normally pressing the wafers against the conveyor.

5. In combination with a machine for applying cream to wafers and the like including a wafer-forwarding conveyor, devices for increasing the friction between the wafers and said conveyor comprising blades or fingers arranged to yieldingly press the wafers against the conveyor, such devices located closely adjacent such points in the travel of the wafers where the cream in contact with the wafer is being acted upon to resist the forward travel of the wafers.

6. In combination, a wafer-forwarding conveyor, a cream supply hopper above said conveyor, an endless traveling cream-spreading band beneath said hopper, a run thereof forming the bottom of said hopper and adapted to carry a layer of cream therefrom, the side wall of said hopper extending transversely of said band at its point of departure from the hopper being adjustable to and away from the band to gauge the thickness of the layer of cream, and means for directing the coated portion of said band toward said conveyor so as to bring the outer face of the layer of cream into contact with the faces of wafers on the conveyor.

7. A structure as set forth in claim 3 wherein the spring hold-down elements consist of a plurality of springs spaced apart in a row extending transversely of the direction of travel of the wafers through the machine.

In testimony whereof, I affix my signature.

ROBERT FRENCH MACFARLANE.